US011186713B2

(12) United States Patent
Kapoor et al.

(10) Patent No.: US 11,186,713 B2
(45) Date of Patent: Nov. 30, 2021

(54) POLYESTER CONTAINERS AND FILMS WITH REDUCED GAS PERMEABILITY

(71) Applicant: DAK AMERICAS LLC, Charlotte, NC (US)

(72) Inventors: Rajat Kapoor, Lexington, SC (US); Peter S. Kezios, Wilmington, NC (US); George F. Rollend, Amherst, NH (US)

(73) Assignee: DAK AMERICAS LLC, Charlotte, NC (US)

( * ) Notice: Subject to any disclaimer, the term of this patent is extended or adjusted under 35 U.S.C. 154(b) by 305 days.

(21) Appl. No.: 16/090,350

(22) PCT Filed: Apr. 11, 2017

(86) PCT No.: PCT/US2017/027018
§ 371 (c)(1),
(2) Date: Oct. 1, 2018

(87) PCT Pub. No.: WO2017/180629
PCT Pub. Date: Oct. 19, 2017

(65) Prior Publication Data
US 2019/0112471 A1    Apr. 18, 2019

Related U.S. Application Data

(60) Provisional application No. 62/320,737, filed on Apr. 11, 2016.

(51) Int. Cl.
*B32B 27/36* (2006.01)
*C08L 67/02* (2006.01)
(Continued)

(52) U.S. Cl.
CPC .......... *C08L 67/02* (2013.01); *B29C 49/0005* (2013.01); *B29C 49/22* (2013.01);
(Continued)

(58) Field of Classification Search
CPC .. C08L 67/02; C08L 2201/14; C08L 2203/10; C08L 2205/025; B32B 27/36;
(Continued)

(56) References Cited

U.S. PATENT DOCUMENTS 5,008,333 A * 4/1991 Yates, III ................ C08L 67/02
                                                          525/132
6,355,319 B1   3/2002 Nakamachi et al.
(Continued)

FOREIGN PATENT DOCUMENTS

CN        1507402 A      6/2004
CN        1556821 A     12/2004
(Continued)

OTHER PUBLICATIONS

Notification dated Nov. 20, 2020 in corresponding Eurasian Patent Application No. 201892041 (with English Translation), 3 pages.
(Continued)

*Primary Examiner* — James C Yager
(74) *Attorney, Agent, or Firm* — Oblon, McClelland, Maier & Neustadt, L.L.P.

(57) ABSTRACT

Three independent approaches to the reduction of gas molecule permeability through a polyethylene terephthalate (PET) polyester film or container wall by increasing the mechanically or thermally induced crystallinity or the overall crystallinity level of a single or multilayer container, where the three approaches may be employed independently or in combination with one another.

5 Claims, 6 Drawing Sheets

(51) Int. Cl.
  *B29C 49/00*   (2006.01)
  *B29C 49/22*   (2006.01)
  *B65D 65/40*   (2006.01)
  *B65D 81/26*   (2006.01)
  *C08K 3/22*   (2006.01)
  *B29K 67/00*   (2006.01)
  *B29L 31/00*   (2006.01)

(52) U.S. Cl.
  CPC .............. *B32B 27/36* (2013.01); *B65D 65/40* (2013.01); *B65D 81/266* (2013.01); *B29K 2067/003* (2013.01); *B29L 2031/712* (2013.01); *B32B 2307/7244* (2013.01); *B32B 2439/00* (2013.01); *C08K 2003/2241* (2013.01); *C08L 2201/14* (2013.01); *C08L 2203/10* (2013.01); *C08L 2205/025* (2013.01); *Y10T 428/139* (2015.01); *Y10T 428/1352* (2015.01); *Y10T 428/1393* (2015.01)

(58) Field of Classification Search
  CPC ........ B32B 2439/00; B32B 2307/7244; B29C 49/0005; B29C 49/22; B65D 65/40; B65D 81/266; Y10T 428/139; Y10T 428/1393; Y10T 428/1352; C08K 2003/2241; B29K 2067/003; B29L 2031/712
  See application file for complete search history.

(56) References Cited

U.S. PATENT DOCUMENTS

| | | | |
|---|---|---|---|
| 2002/0037377 A1* | 3/2002 | Schmidt .................. | C08K 3/08 428/35.8 |
| 2003/0087030 A1 | 5/2003 | Hama et al. | |
| 2003/0186006 A1 | 10/2003 | Schmidt et al. | |
| 2010/0159179 A1 | 6/2010 | Frost et al. | |
| 2010/0201015 A1 | 8/2010 | Fujimaki et al. | |
| 2012/0225986 A1 | 9/2012 | Jarvis et al. | |
| 2013/0183467 A1 | 7/2013 | Thompson et al. | |
| 2014/0134372 A1 | 5/2014 | Young et al. | |

FOREIGN PATENT DOCUMENTS

| | | |
|---|---|---|
| CN | 101568578 A | 10/2009 |
| CN | 101880445 A | 11/2010 |
| CN | 103102646 A | 5/2013 |
| CN | 105102199 A | 11/2015 |
| EP | 1 155 807 A1 | 11/2001 |
| EP | 2 851 391 A1 | 3/2015 |
| JP | H02-172738 A | 7/1990 |
| JP | 2895498 B2 | 3/1999 |
| JP | 2008-523170 A | 7/2008 |
| JP | 2010-523791 A | 7/2010 |
| JP | 2016-510271 A | 4/2016 |
| KR | 10-2011-0101748 A | 9/2011 |
| WO | WO 91/08263 A1 | 6/1991 |
| WO | WO 2014/118285 A2 | 8/2014 |

OTHER PUBLICATIONS

Office Action dated Apr. 11, 2016 in corresponding Egyptian Patent Application No. 2018091536, 5 pages, citing document AO therein.
Eurasian Office Action dated May 12, 2020, in Patent Application No. 201892041/28, 3 pages (with English translation).
International Search Report and Written Opinion dated Sep. 22, 2017, in PCT/US2017/027018, filed Apr. 11, 2017.
Extended European Search Report dated Dec. 11, 2019, in Patent Application No. 17782983.5, citing document AA therein, 11 pages.
European Office Action dated Jan. 10, 2020, in Patent Application No. 17782983.5, 1 page.
Partial Supplementary European Search Report dated Sep. 26, 2019 in European Patent Application No. 17782963.5, citing documents AO, AP and AQ therein, 12 pages.
Korean Office Action dated Oct. 10, 2019 in Korean Patent Application No. 10-2018-7029138 (with English translation), citing documents AO and AP therein, 22 pages.
Combined Chinese Office Action and Search Report dated Dec. 16, 2019, in Patent Application No. 201780023093.1, citing documents AO-AS therein, 16 pages (with English translation).
Indian Office Action dated Jun. 4, 2020 in Patent Application No. 201817036062 (with English translation), 8 pages.
Eurasian Office Action dated Sep. 30, 2019 in Eurasian Patent Application No. 201892041/28 (with English translation), 3 pages.
Indonesian Office Action dated Feb. 16, 2021 in Indonesian Patent Application No. P00201808025, 1 page.
Office Action dated Feb. 20, 2021, in Chinese Patent Application No. 201780023093.1 (w/ Computer-generated English Translation).
Egyptian Office Action dated Mar. 25, 2021 in Egyptian Patent Application No. 2018091536 (with English translation), 8 pages.
Office Action, dated Aug. 31, 2021, in Japanese Patent Application No. 2018-553395 (w/English translation).

* cited by examiner

POLYESTER CONTAINERS AND FILMS WITH REDUCED GAS PERMEABILITY

BACKGROUND OF THE INVENTION

Field of the Invention

The invention applies to improvement of gas barrier in a rigid polyester container or film wall, which is important in applications such as carbonated soft drink (CSD) bottles as well as for oxygen sensitive products.

Description of the Background

A gas barrier may be passive type, where there is a physical encumbrance to transit of a diffusing gas molecule, or an active type, where special additives bind, react, scavenge, or entrap the diffusing gas molecule via a chemical reaction. Increasing mechanically or thermally induced crystallinity to improve barrier properties falls under passive type, where the closely packed crystals are relatively impervious to a diffusing gas molecule and gas molecule diffusion is greater within inter-crystalline areas filled by relatively open amorphous polyester structures. The third concept of heat management, however, applies to both passive barrier, from a crystallization perspective, and active barrier by potentially promoting enhanced thermo-chemical activation of a scavenger or other gas barrier species.

Polyethylene terephthalate and co-polyesters of polyethylene terephthalate (polyethylene terephthalate and co-polyesters of polyethylene terephthalate are hereinafter referred to as PET) are preferred packaging materials for multi-serve and single-serve CSD and still beverages and food stuffs. Beverages commonly packaged with PET include carbonated soft drinks, juice, juice drinks, water, flavored water (still and carbonated), hydration drinks, teas, new age drinks, milk and milk drinks, etc. PET has a number of properties that make its use for packaging such drinks favorable. For example, PET has mechanical strength, e.g. drop impact strength, burst strength and thermal expansion when biaxially oriented, and gas barrier resistance, all of which are properties that make PET desirable as a packaging material for beverage containers and provide container design freedom.

Polyester resins such as poly(ethylene terephthalate) (PET), polybutylene terephthalate) (PBT), poly(ethylene naphthalate) (PEN), poly(trimethylene terephthalate) (PTT), and poly(trimethylene naphthalate) (PTN), have conventionally been used as resins in the manufacture of food and beverage containers such as beverage bottles. Some resins such as PTT, PEN and PTN are used mainly for specialized packaging applications because these resins are significantly more expensive to manufacture than, for example, poly(ethylene terephthalate) resins. Properties such as flexibility, good impact resistance, and transparency, together with good melt processability, permit polyester resins to be widely used for making food and beverage containers. PET resins are among the most widely recycled plastics.

An important property of any polymer resin such as a PET resin used in food container or beverage container applications is the resin's ability to resist the ingress and egress of gases, such as oxygen ($O_2$) and carbon dioxide ($CO_2$), through the container's walls. Containers for carbonated beverages may be especially susceptible to the egress of gases such as carbon dioxide which are normally present in carbonated soft drinks. Usually, a carbonated soft drink will contain about 4 volumes of dissolved carbon dioxide gas per volume of the liquid carbonated soft drink. Other beverages such as beer typically have approximately 1.5 to 3.0 volumes of total dissolved carbon dioxide. If the resin used to form a beverage container permits carbon dioxide to escape, the product delivered to the consumer may be of unacceptable quality (e.g., "flat") if stored too long. In food container applications, it is important that the resin resists the ingress of oxygen. Oxygen in contact with a food substance may lead to color changes and oxidation that accelerates the staleness of the food product.

PET and the other aforementioned polyesters do not meet all of the gas barrier requirements for small size single serve drink containers (e.g., containers for serving sizes of less than 24 oz.). To be acceptable for single serve drink containers, a packaging container must be able to provide retention of $CO_2$ for carbonated soft drinks and exclusion of $O_2$ for oxygen sensitive drinks or in the case of beer, both $CO_2$ egress and $O_2$ ingress. Large, multi-serve containers made from PET generally meet the packaging requirements with respect to $CO_2$ retention and/or $O_2$ exclusion and are thus able to maintain the quality of the drink product reaching the consumer after filling, shipping, storage and purchase by the consumer. Similar performance in single-serve drink containers is desirable to meet consumer demand for smaller serving size to provide convenience and portion control. The beverage brand companies have had long time marketing need for the distribution of single-serve plastic containers in multi-packs, e.g. 12- and 24-packs, distributed by the club stores if the shelf-life could be improved 2×. This market segment is currently served by cans due to the shorter shelf life of the single serve plastic containers.

Different technologies have been applied to enhance the gas barrier properties of PET packaging materials. For example, PET containers may be coated with an internal and/or external coating to improve gas barrier performance. Other methods for improving gas barrier performance in PET containers include the use of multi-layers, co-monomer substitution and the use of polymer blends.

Conventional technologies for improving gas barrier performance typically require the use of manufacturing equipment that is substantially more complicated, requires a greater initial capital outlay and greater operating expenses. Not only are the economic demands unfavorable, the use of such technologies can negatively affect the appearance and/or aesthetic properties, e.g. delamination of the layers of a container and/or the recyclability of PET containers.

Polymer blends are typically made from a mixture of a PET blended with another polyester material such as polyethylene naphthalate (PEN), polyethylene isophthalate (PEI) or other types of polymers such as polyamides (e.g., nylon). PET can also be modified by using co-monomers that are directly bonded to the polyester polymer chain. Co-monomers such as isophthalate-, naphthalate- and resorcinol-based diols may improve gas barrier performance. However, in order for a PET copolymer to achieve even moderate improvement in gas barrier performance, e.g., preferably a 1.2 to 2× or greater barrier improvement factor (e.g., an improvement in gas barrier resistance of at least 100%), the PET polymer normally requires the addition of 10-20 weight % or mole % of other co-monomers. This can substantially increase the cost of the PET resin and/or the complexity of the process used to manufacture the resin and bottles made from the resin, as well as create problems with other physical properties of the resin.

Crystallinity is an important factor in gas permeability of a polymer because the polymer crystals are relatively impermeable as compared with the amorphous regions within the polymer bulk. Thus, a permeant gas molecule must preferentially seek out amorphous regions in order to rapidly penetrate a polymer. A lower degree of crystallinity results in higher gas permeability. The polymer state with the highest degree of crystallinity provides the lowest gas permeation, thus a better gas barrier. Increased molecular orientation may also reduce gas permeability. Increasing the molecular order, packing, and crystallinity of polymeric gas barrier materials increase density and thus, decrease gas permeability.

Free volume which exist in glassy polymers such as PET which have a Tg that is substantially higher than ambient temperature, may affect a resin film's ability to resist the passage of gases. Free volume is considered to be representative of un-relaxed volume of the resin and represent the remaining spaces in a polymer matrix that occur when a polymer becomes glassy and segmental mobility of the main chain is frozen. In some positron annihilation lifetime (PAL) measurements for glassy polymers, it has been reported that the mean diameter of free volume (be consistent with terms throughout document) is on the order of angstroms (e.g. less 10 Angstroms).

Free volume in the glassy polymer may consist of two independent components, one of which is affected by annealing and the other by anti-plasticization. Anti-plasticization may occur when small amounts of certain plasticizers are added to certain glassy polymers. Anti-plasticization is only observed in the temperature regions below the glass transition temperature ($T_g$) of the polymer. Anti-plasticization arises from an interaction between the polymer and the plasticizer molecules and decreases the molecular mobility of the polymer and plasticizer. Anti-plasticizers are compounds which are compatible with PET resins and which contain one or more polar atoms such as oxygen, nitrogen, etc. and have at least one aromatic ring with or without a non-bridged ring.

Polyethylene isophthalate (PEI) made from 100% purified isophthalic acid has high-barrier properties and has a much lower $CO_2$ permeability than amorphous or crystalline PET. This can be considered to be a result of differences in the dynamic conformational flexibilities between PEI and PET. In PEI, the meta-attachment of ethylene glycol units prevents the flipping of phenyl rings in the PEI polymer. Amorphous PET is able to freely flip its phenyl rings without changing its overall conformation, i.e., without moving or changing the conformation of the PET backbone. The free flipping of phenyl rings in PET may provide an effective pathway for gases to permeate through bottle side walls/films/sheeting and may make PET more permeable to gases than PEI. In real practice, PEI chips are completely amorphous and special drying procedures are needed to prevent stickiness. PEI will soften and agglomerate above $T_g$ (~60° C.). PEI should be dried at <50° C., preferably under vacuum. To resolve special drying conditions for chips and provide adequate crystallinity for chips, only a narrow range (~10-20%) of IPA can be present in the polymer backbone to offset the large use of expensive organic diluents. Otherwise, additional separate material dryers are required for this option.

The addition of a monomeric or polymeric organic molecule in small amounts to a base polymer (e.g., a polyester or co-polyester such as PET, PEI etc.) can result in anti-plasticization of the polymer whereby its resistance to gas permeability can improve. For example, the inclusion of tricresyl phosphate in polyphenylene oxide has been disclosed to lower the sorption of carbon dioxide and hence reduce the resin's permeability to carbon dioxide [Maeda, Y. and D. R. Paul, J. Polym. Sci., Part B: Polym. Phys. 25, 981-1003 (1987)]. Polymeric anti-plasticization of polycarbonate with poly-caprolactone has also been reported [Siegmann, A., Polym. Eng. Sci., 1994].

The addition of low molecular weight compounds to PET is a technology that has been used to improve gas barrier performance in PET polymer films, bottles and containers for packaging applications. Such low molecular weight compounds are typically referred to as molecular barrier additives. When present as a mixture with PET, low molecular weight compounds occupy free volume within the polymer matrix and may interact with different polymer chains through polar groups on the low molecular weight compound and the polymer chains. Robeson and Faucher disclosed in *J. Polymer Science* (1969) that the presence of certain low molecular weight compounds in polymeric materials such as polycarbonate, polyvinyl chloride, polyphenylene oxide, and polyethylene oxide may lead to an increase in the modulus of the polymeric material and concurrently reduce gas permeability. These effects were thought to be due to an anti-plasticization effect. Anti-plasticization is an effect whereby the chains of polymers in a polymeric matrix and/or polymer-containing composition have secondary interactions with other molecules, e.g., with a further compound or with other polymer molecules present in the matrix.

Ruiz-Trevino and Paul disclosed that certain low molecular weight compounds may function to improve the gas barrier properties of polysulfone membranes and/or films. It was speculated that a mechanism that results in interaction of the polar groups of the compounds with the polar groups of the polysulfones reduces the free volume of the polysulfone compositions, for example by bringing the polysulfone chains closer to one another. The resulting composition thereby provided reduced the gas permeability. The low molecular weight compounds were present in amounts from 10 to 30% by weight.

U.S. Pat. No. 6,489,386 discloses compositions that include one or more PET polymers and methyl-4-hydroxybenzoate and/or a compound related thereto. The addition of an ester-containing additive was found to affect gas barrier properties.

U.S. 2006/0275568 discloses the use of dialkyl esters of aromatic diacids as additives for PET compositions. Improved gas barrier performance was obtained without any significant change in the intrinsic viscosity (IV) of the composition when certain catalysts such as Ti- and Al-containing catalysts were used and the compositions were otherwise free of catalyst metals such as Sb, Co, Ca, etc.

U.S. 2005/0221036 discloses the use of naphthalene dihydroxides in PET compositions. The inclusion of compounds of formula HO-AR-OH, where the AR group is a naphthalene-containing group, was shown to reduce the gas permeability of the polymer compositions.

U.S. 2007/0082156 discloses the use of a purine derivative, particularly a purine dione such as caffeine as an additive to PET to improve the oxygen and carbon dioxide barrier properties of the resulting beverage container.

Additional gas barrier references include U.S. Pat. Nos. 6,090,460, 6,461,697, 6,602,568, 6,808,820, U.S. 2005/0009976, and U.S. 2011/0036850.

Thermoplastic PET resins are used in the packaging industry for rigid, semi-rigid, and flexible film containers. Commonly used rigid packages are containers for carbonated and non-carbonated beverages and food as well as non-food liquids, such as shampoos and household detergents. These containers can be made by a two-step process.

In the first step a preform is produced by injection molding, and in the next step the preform is reheated and biaxially stretched and blown to give final container shape, size, and integrity with desirable thermo-mechanical properties.

As a pre-conditioning step prior to the injection molding process, the polyester resin(s), of similar species or physical mixtures have to be dried and fed from a drying hopper. They are then conveyed and melted by extrusion screw and injected under pressure into a mold. The mold may have one or more preform cavities to make a one or several preforms in a single cycle. The molded preform may have a single- or multi-layer structure type. In a single-layer application, the matrix composition is one polyester resin throughout the preform bulk.

In a multi-layer application, two or more different resins may be fed independent of each other to create a multilayered preform structure. For example, a three layer bottle may have an ABA structure, where a middle layer of resin B is sandwiched between two structural layers of resin A on either side. The B layer is often a thin section of the wall, generally about 5-15% of the total preform wall thickness. The multi-layer bottles allow for a specialized resin, often with higher cost and/or with reduced compatibility with the PET structural layers, to be isolated in a specific location within the container. The final structure is ABA, the co-injection injection molding sequence is A AB A: where A is injected first, while A is being injected, B is introduced, then B is stopped and A continues until the final preform is packed out.

The timing sequence and mold temperatures can be adjusted to position the specialized B layer in the center of the preform or preferentially to the inside or outside of the preform wall. The sequence can also be managed to position the specialize B layer so that it only falls within the amorphous regions of the preforms that will eventually reheated and stretch blow molded. The advantage of this is to minimize or eliminate the specialize material from being in the thicker amorphous regions of the thread finish and base pushup regions that do not get stretched during the blowing process. This also allows for the total encapsulation of the specialized B polymer. A second option is to create a 5 layer structure ABABA via a sequential injection molding sequence A-B-A. In this case, A is injected first, and then stopped, B is injected next and then stopped, and then A is injected last packing out the preform. This creates two thin B layers due to the 'Fountain Flow" filling of injection molding cavities.

In the blow molding step, preforms are loaded on a conveyor and are passed in front of infrared (IR) heating lamps to heat the preform typically 10-20° C. above the polymer glass transition temperature ($T_g$) prior to the stretching and blowing steps. The preform is thicker and shorter than the final container wall to account for the self-leveling of the polymer and the resulting axial and hoop stretch ratios (blow up ratio BUR) of the final container shape. To reheat the preform uniformly, typically, a low concentration of IR absorbing species, called reheat or fast heat up additive, are added to the polymer to improve the absorption of IR-radiation by the polyester preform and subsequently conduct heat into the surrounding preform wall section.

The preform reheating process is inefficient. The IR selective wave-length lamps radiate energy to penetrate the PET preform, but also require air circulation to cool the preform surfaces during the reheating process due to the low heat conductivity of the PET. Not cooling the preform surface can result in overheating and the onset of crystallization of the surfaces rendering the container opaque or hazy.

On application side, the stretch blow molded PET containers offer convenience of meeting physical and other application requirements such as dimensional stability, clarity, cost, and recyclability. However, unmodified PET containers have relatively high gas permeability and may allow diffusion of gas molecules in both directions across the container wall. In a typical CSD package, the container is pressurized to in excess of 4 volumes of $CO_2$, which over a span of several weeks will be absorbed into and diffused through the container sidewalls, lowering the carbonation level below the brand company's minimum that is known to affect the tasted of the product. In the case of some food type products, e.g., ketchup bottles, oxygen from the ambient air will ingress into the container and can alter the taste and color of the product. In either case, absorption and diffusion of gas molecules through the walls of the PET plastic container may limit the product's shelf life.

CSD product shelf life is adversely affected for smaller packages which have higher surface area to volume ratio and therefore suffer relatively higher carbonation loss than larger volume containers.

The shelf life for these containers can be increased by improving gas barrier properties of the plastic container. A barrier layer within a container may be 'passive' or 'active' or a combination of both.

With a passive barrier, gas diffusion may be retarded by combining PET with more impervious copolymers or by increasing the diffusive path length by increasing tortuosity of a less resistive pathway. MXD6 nylon and EVOH are just two examples of barrier type polymers that are commonly used to accomplish the former, while exfoliated clays may be used for the latter. A passive gas barrier retards diffusion of $CO_2$ and/or $O_2$. However, it does not stop the flux of gas molecules in or out of the container wall.

An active gas barrier, e.g. an oxygen scavenging molecule, involves reaction and subsequent immobilization of gas molecules with a polymeric or other compound, typically in presence of a catalyst. Over time, continued oxygen ingress can exhaust the reactive species. Therefore, active barrier systems can attain longer shelf life if the underlying permeability of the base polymer container is also enhanced to retard gas diffusion.

A straightforward way of improving gas barrier is to thicken the container wall, since greater thickness can increase the diffusive path length. However, such a solution is generally not preferred as it increases the container cost as more material and energy are consumed to make such a container. In addition, a thicker container has an adverse environmental footprint due to its increased weight, production energy, and transportation fuel consumption. While not a preferred option, this approach imposes an upper limit constraint on the additional cost incurred to improve gas barrier performance.

The specialized nature of both active and passive gas barrier systems makes them significantly more expensive than the base PET resin. Between the high cost of these special polymers, such as MXD6 and EVOH, and the option of increasing PET container thickness, one commercial solution is to put these special barrier polymers into a multi-layer structured container such that a dedicated, but thin, layer(s) of the expensive barrier polymer is used. In a three layer container, the middle layer may be 1.5-15% of the average container thickness, and therefore a similar minority percentage of the overall container weight, allowing of course, for material density differences.

Nylon based special gas barrier resins have deficiencies, even when used in relatively small amounts. They can delaminate during or after blow molding due to insufficient adhesion between layers, cause undesirable yellow color and/or haze, and act as a contaminate in the existing post-consumer PET recycling streams.

The recyclability issue with nylon based PET containers is important. A relatively small amount of these additives, which may help prolong shelf-life for consumers by some weeks, can render the entire, predominantly-PET container unattractive for recycling.

Another subset of rigid containers is the heat-set container for hot-filling applications. These are containers used for food and drinks, such as juices and sport drinks, which require the contents to be filled hot, greater than $T_g$ of PET. The hot-filling requirement is satisfied by blow molding machines and processes that anneal the container in its final shape at or above the anticipated product fill temperature, such as 85-95° C., so that it will not shrink more than 1% when exposed to temperatures exceeding PET's glass transition temperature ($T_g$). The heat-set blow molding machines have specialized heated molds, where hot oil is recirculated behind the molding surface walls, thereby annealing the container via time at the specific annealing temperature of up to 145° C. In addition, these machines include a special air flushing system required to cool these hot bottles prior to ejecting from the hot molds to allow them to cold below the $T_g$ to prevent deformation of the walls. The typical flushing air process can consume up to 3× the high pressure air requirements than a normal or cold mold stretch blow molding process. This is one of the highest energy consumptions of a heat-set bottle.

SUMMARY OF THE INVENTION

Figure 1:
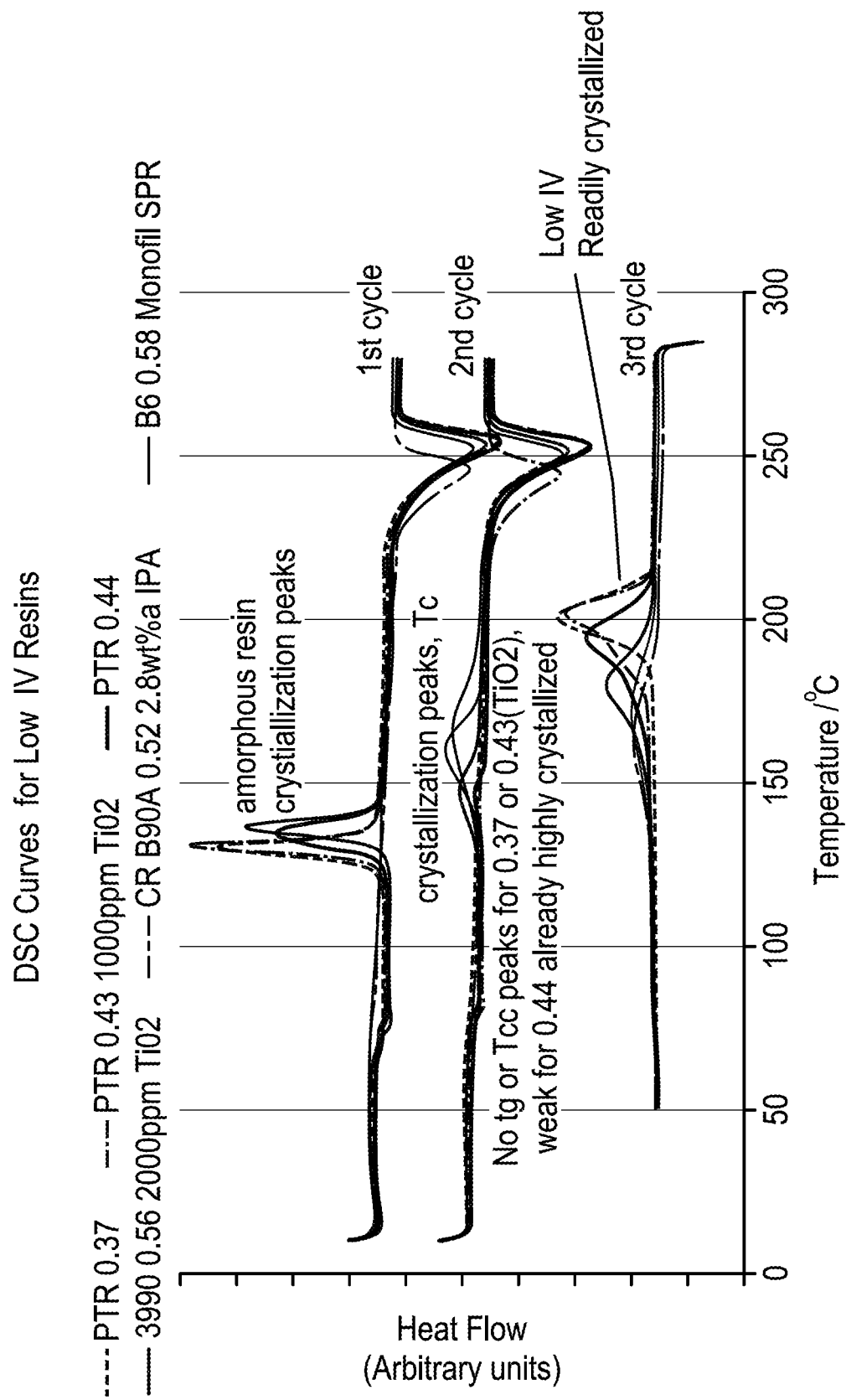
FIG. 1 shows a DSC for a resin set.

The invention relates to reduction of gas molecule permeability through a polyethylene terephthalate (PET) polyester film or container wall by increasing the mechanically or thermally induced crystallinity or the overall crystallinity level of a single or multilayer container via three independent approaches that may be employed independently or in combination with one another. These approaches are introduction into one or more layers of film grade or bottle grade PET resin of (1) PET or other polyester of low IV (i.e. very short polymer chain length) that crystallizes more easily than film grade or bottle grade PET to provide nuclei and promote additional crystallization, (2) polyester with deliberately low level of substitution of rigid terephthalic di-acid (TA) by a more flexible di-acid molecule, such as adipic acid, to allow the folding PET molecules a greater freedom of movement to heal defects and increase molecular alignment thereby promote additional crystallization, and/or (3) finely distributed infrared heat absorbing species in high enough concentration to generate highly localized temperatures and thereby promote additional mechanically or thermally induced crystallinity.

DETAILED DESCRIPTION OF THE PREFERRED EMBODIMENTS

The invention utilizes three independent approaches to encourage and manage mechanically or thermally induced crystallization in PET container or film wall that results in higher gas barrier properties and/or container annealing than expected without the proposed embodiments.

In approach 1, a shorter polymer length and/or lower molecular weight polyester molecule, as defined by a lower solution intrinsic viscosity (IV), is blended together with a base container resin of higher IV (e.g., longer polymer chain length and/or greater molecular weight), expressed as weight percentage in the final mix. The lower IV resin is more likely than the base resin to have a much shorter PET molecular length (e.g., polymer chain length) and/or a molecular weight distribution shifted towards a lower value. The shorter length (e.g., polymer chain length) and/or lower molecular weight molecules (e.g., polymer chains) have a higher probability of fewer inter- and intra-molecular entanglements as compared to the much longer chain length molecules of the base polyester. The higher mobility of these short molecules allows them, as individual molecules or clusters of molecules, to fold into ordered crystalline structures much more readily than the PET base resin. And thereby, the shorter length and/or lower molecular weight molecules and clusters can create nuclei from which the PET base resin is encouraged to crystallize more rapidly and to a greater extent. The combined effect is to encourage greater crystallinity and formation of numerous small nuclei, which leads to better gas barrier properties by means of more "impervious" crystallite formation and/or greater tortuosity of the least resistive gas diffusion pathway due to multitude of small crystals distributed within the base PET polymer matrix.

Selection of the preferred low IV value and weight percentage blend level will depend on the balance of application requirements, typically the container's mechanical performance versus its gas barrier performance. The high intrinsic viscosity PET normally has a solution IV between about 0.65 and about 1.30 dL/g. As a non-limiting example, typical PET bottle resin IV is 0.72-0.84 dL/g. This base resin may be combined with roughly 10 weight percent (WT %) of resin with much lower IV, such as 0.40 dL/g to injection mold single-layer or multi-layer preforms. The IV of the much lower IV resin is less than about 0.55 dL/g, preferably less than about 0.50 dL/g, more preferably less than about 0.45 dL/g, and most preferably about 0.40 dL/g.

Resin combination may be carried out as a dry blend at or prior to entering the feed throat of the injection molding extruder making the preform, with or without modifications, to give good mixing while maintaining short melt residence time during the extrusion process, so that substantial molecular length (e.g., polymer chain length) re-equilibration does not occur. Resin combining may also be done during resin manufacture in the melt phase prior to pelletization. Additionally, base PET resin and low IV resin may be combined as discrete layers of a three-layer, five-layer, or other multi-layer structured preform.

In approach 2, the polymer's gas barrier performance is improved by increasing the flexibility of the PET base resin by introducing a low level of co-monomer, similar in molecular length and/or molecular weight to terephthalic acid (TA) but with greater molecular flexibility. Enhanced molecular flexibility resulting from increased rotational possibilities along aliphatic segments of the modified polyester will promote crystallization and heal crystal defects.

The choice and concentration of flexible co-monomers, with similar length and/or molecular weight as TA, such as adipic acid, depends on balancing two competing effects. Too much molecular segment flexibility can cause disruption of the regular repeat periodicity of TA+Ethylene Glycol (EG) (or other diol co-monomer) segment that is necessary for chain folding and crystal formation while too little molecular flexibility enhancement may result in a beneficial effect that is simply too small to deliver a measurable gas barrier performance improvement.

In the context of the present disclosure a flexible diacid and/or diol having a similar length and/or molecular weight to TA is a diacid and/or diol molecule that forms a polymerized unit of a polyester polymer that has a length (e.g., span from one terminal oxygen atom to the other terminal oxygen atom) that is substantially the same as the length of a polymerized monomer unit of TA in the polyester polymer. Similarity in the lengths of the monomer units provides a polyester in which the repeating monomer units have the same or similar lengths. Preferably the flexible diacid and/or diol has a length that is ±50%, 40%, 30%, 20%, 15%, 10%, 5% or 3% of the length of TA. Length is the length of the polymerized monomer unit in the polyester in solid crystalline form. In this way a polyester containing mixed units of flexible diacid and/or diol and TA has substantially the same length end-to-end as a polyester consisting of a number of TA monomer units that is substantially the same as the total number of flexible diacid and TA monomer units. The polyester Flexible diacids include acetic acid, succinic acid, malonic acid, glutaric acid, pimelic acid, azelaic acid, sebacic acid, suberic acid, and adipic acid. Derivatives of the aforementioned preferred diacids in which the hydrocarbon chain has one or more hydrocarbon branches (such as methylene, ethylene, propylene and/or butylene) may also be used. Flexible diacids generally include diacid materials in which two acid terminals (e.g., —OK groups) are connected by a hydrocarbon unit, preferably a non-aromatic hydrocarbon unit. The hydrocarbon is cyclic or acyclic and preferably has 4-10 carbon atoms, more preferably 6-8, although 5 and 7 carbon hydrocarbon units are also acceptable. Especially preferred flexible diacids and/or diols have a linear hydrocarbon connecting the terminal acid or hydroxyl groups (for diols). In some embodiments the hydrocarbon unit includes a single aromatic phenyl group that is bonded to the two terminal acid groups through hydrocarbon linker units such as methylene, ethylene or propylene, in a para arrangement across the phenyl group.

Flexible diols include ethane-1,2-diol, propane-1,2-diol, butane-1,4-diol, cyclohexane-1,2-diol, ethylene glycol, diethylene glycol, 1,4-cyclohexane-dimethanol, 1,3-propanediol, 1,4-butanediol, propylene glycol (1,2-propanediol), 2-methyl-1,3-propanediol, and 2,2-dimethyl-1,3-propanediol (neopentyl glycol) and mixtures thereof.

In a further embodiment the diacid and/or diol has a molecular weight that is similar or substantially the same as TA. In this respect the flexible diacid preferably has a molecular weight that is ±50%, 40%, 30%, 20%, 15%, 10%, 5% or 3% of the molecular weight of TA, preferably the diacid is a linear diacid that has a lower molecular weight than TA (e.g., a molecular weight that is 50%, 40%, 30%, 20%, 15%, 10%, 5% or 3% less than the molecular weight of TA.

In an especially preferred embodiment the flexible diacid and/or diol both have a molecular length and molecular weight that is similar to TA. For example, both the molecular length and molecular weight of the flexible diacid are ±30%, 20%, 15%, 10%, 5% or 3% of the molecular length and molecular weight of TA, more preferably the molecular weight of the flexible diacid is 30%, 20%, 15%, 10%, 5% less than the molecular weight of TA whereas the molecular length of the diacid is ±20%, 15%, 10%, 5% or 3% of the molecular length of TA.

In approach 3, the level of infrared fast reheat/fast heat-up absorbing additive, or more commonly "reheat" additive is boosted considerably beyond current practice to affect heat transfer rate and amount from the IR quartz lamps and promote thermal crystallization beyond current practice.

In one embodiment, the middle layer of a three layer multilayer bottle, generally 3-30 WT % of the total perform, may have a sufficiently high concentration of fast reheat additive so that the local temperature of the special resin in this layer may rise beyond the normally practiced range 90-110° C. and up to the thermal crystallization temperature ($T_c$) or even melting temperature ($T_m$). Management and confinement of this unusually high temperature polymer within a relatively thin but controlled discrete layer(s) of the container wall is a unique opportunity to increase mechanical or thermal crystallinity within or near the hot layer. Potentially, in the case where the hot polymer layer exceeds $T_m$, one may even alter extensional polymer flows (self-leveling) and molecular orientation (strain-induced crystallinity-SIC) within the hot layer, without threatening the blow molding process and while preserving the overall dimensional stability and integrity of the container, since the other layers containing base PET resin are substantially unaffected by the hot layer due to the relatively low thermal conductivity of thermoplastic polymers as compared with the reheating rate and stretch blow molding time. Additional mold cooling time may be required to insure maximum capture of the unique physical characteristics of the inventive container and control or stop the exothermic crystallization process.

The approach also allows for trapped heat in middle layer, typically sandwiched by layers of PET bottle grade resin, an insulator by nature, to conduct slowly out from inside the blow molding cavity. This is beneficial for heat set containers where the blow mold cavity metal wall may be heated to anneal the newly formed container wall to relax orientation within amorphous PET regimes at temperatures above the product fill temperature, thereby minimizing container dimensional shrinkage from hot filling. The ability to absorb and retain heat in this narrow layer, along with relatively slow heat loss, boosts energy efficiency and continues the annealing process until the bulk polymer temperature drops below the base polymer glass transition temperature ($T_g$).

Heat setting stretch blow molding machines are specialized to heat the wall of mold cavity and thereby anneal the container. The innovative approach relating to IR absorbing fast heat-up additives will help to either reduce the energy required for container annealing or eliminate the need for a heated mold and potentially the need for expensive high pressure flushing air. Use of the sensible reheat energy coming from the high IR absorbing middle layer may increase equipment flexibility so that other, non-hot-setting (non-annealing) stretch blow molding machines can produce heat-set containers with annealed walls which are suitable for certain hot filling applications.

Each of these three approaches delivers a sustainable and recyclable container without potential delamination within the walls of the final container. The lower IV PET approach introduces no new polymer species. The IR absorbing fast reheat additive approach uses an inert additive that does not impact PET recyclability. And the flexible co-monomer approach introduces such a small WT % of non-PET segments within the polyester molecules as to be virtually inconsequential. Each of these innovative approaches may be more cost effective than current specialized barrier improvement alternatives.

The present invention includes, but is not limited to, the following embodiments:

Embodiment 1. An injection molded, stretch blow molded, or extrusion blow molded container with a polymer composition comprising a blend of high and low intrinsic viscosity (IV) polyethylene terephthalate (PET) where the high intrinsic viscosity PET has a solution IV between about 0.65 and about 1.30 dL/g and the low intrinsic viscosity PET has a solution IV of 0.55 dL/g or less, preferably 0.050 dL/g or less, more preferably 0.45 dL/g or less, and most preferably 0.40 dL/g or less.

Embodiment 2. A container of Embodiment 1, where the weight percentage (WT %) of low viscosity PET comprises between 2 and 50 WT % of the final container, preferably between 3 and 35 WT %, more preferably between 4 and 20 WT %, and most preferably between 5 and 15 WT %.

Embodiment 3. A container of one of Embodiments 1 or 2, where the high viscosity PET component has an IV between about 0.70 to about 0.9 dL/g.

Embodiment 4. A container of any one of Embodiments 1 to 3, where the blended polymer composition may be prepared either during melt-phase or solid-phase resin manufacture, or re-extruded and re-pelletized, or dry blended during preparation for or during container manufacture.

Embodiment 5. A container of any one of Embodiments 1 to 4, that has improved gas barrier performance without requiring active $O_2/CO_2$ gas barrier additives.

Embodiment 6. A container of any one of Embodiments 1 to 5, where the low viscosity component is confined to one or more discrete or semi-discrete layers which comprise an overall multi-layer container structure.

Embodiment 7. A container of Embodiment 6, where the layers of the final container have a reduced tendency to delaminate or separate.

Embodiment 8. A container of one of Embodiments 6 or 7, where the gas barrier properties of the container remain essentially unchanged over time by ambient conditions, such as moisture or temperature.

Embodiment 9. A container of any one of Embodiments 6 to 8, that is fully compatible with the existing PET recycling streams as defined by the Association of Plastics Recyclers (APR) Critical Guidance.

Embodiment 10. An injection molded, stretch blow molded, or extrusion blow molded container with a polymer composition comprising a random PET copolymer of terephthalic acid and a non-aromatic, flexible diacid or diol molecular segment, of similar molecular length as terephthalic acid (TA) where the non-aromatic, flexible diacid or diol comprises a weight percentage (WT %) of the final polymer of 3.0 WT % or less, preferably 2.0 WT % or less, more preferably 1.0 WT % or less and most preferably 0.5 WT % or less.

Embodiment 11. A container of Embodiment 10, where the final random PET copolymer has an IV between about 0.70 to about 0.9 dL/g.

Embodiment 12. A container of one of Embodiments 10 or 11, where the non-aromatic flexible chain diacid or diol may be adipic acid or cyclohexane dimethanol.

Embodiment 13. A container of any one of Embodiments 10 to 12, where the random PET polymer that includes a non-aromatic, flexible diacid or diol molecular segment is confined to one or more discrete or semi-discrete layers comprising a multi-layer container structure.

Embodiment 14. A container of Embodiment 13 where the layers of the final container have a reduced tendency to delaminate or separate.

Embodiment 15. A container of one of Embodiments 13 or 14, where the gas barrier properties of the container remain essentially unchanged over time by ambient conditions, such as moisture or temperature.

Embodiment 16. A container of any one of Embodiments 13 to 15, that is fully compatible with the existing PET recycling streams as defined by the Association of Plastics Recyclers (APR) Critical Guidance.

Embodiment 17. An injection molded, stretch blow molded, or extrusion blow molded container with a polymer composition comprising a PET polymer with a high level of IR absorbing fast reheat additive where the reheat additive comprises a weight fraction of the final polymer of 25 or more parts per million (PPM), preferably 50 or more PPM, more preferably 100 or more PPM, and most preferably 200 or more PPM.

Embodiment 18. A container of Embodiment 17, where the IR absorbing fast reheat additive is one of carbon black, lamp black, black iron oxide, titanium nitride, reduced antimony, or combinations of these reheat additives.

Embodiment 19. A container of one of Embodiments 17 or 18, where the PET polymer with a high level or IR absorbing additive is confined to one or more discrete or semi-discrete layers comprising a multi-layer container structure.

Embodiment 20. A container of Embodiment 19, where the layers of the final container have a reduced tendency to delaminate or separate.

Embodiment 21. A container of one of Embodiments 19 or 20, where the gas barrier properties of the container remain essentially unchanged over time by ambient conditions, such as moisture or temperature.

Embodiment 22. A container of any one of Embodiments 19 to 21, that is fully compatible with the existing PET recycling streams as defined by the Association of Plastics Recyclers (APR) Critical Guidance.

Embodiment 23. An injection molded, stretch blow molded, extrusion blow molded, or thermoformed container with a polymer composition comprising a blend of high and low viscosity polyethylene terephthalate (PET) where the high viscosity PET has an IV between about 0.65 and about 1.30 dL/g and the low viscosity PET has an IV of 0.55 dL/g or less, preferably 0.050 dL/g or less, more preferably 0.45 dL/g or less, and most preferably 0.40 dL/g or less, and where the low viscosity PET has a high level of IR absorbing reheat additive where the reheat additive comprises a weight fraction of the low IV PET polymer of 25 or more parts per million (PPM), preferably 50 or more PPM, more preferably 100 or more PPM, and most preferably 200 or more PPM.

Embodiment 24. A container of Embodiment 23, where the low IV PET polymer with a high level or IR absorbing additive is confined to one or more discrete or semi-discrete layers comprising a multi-layer container structure.

Embodiment 25. A container of Embodiment 24, where the layers of the final container have a reduced tendency to delaminate or separate.

Embodiment 26. A container of one of Embodiments 24 or 25, where the gas barrier properties of the container remain essentially unchanged over time by ambient conditions, such as moisture or temperature.

Embodiment 27. A container of any one of Embodiments 24 to 26, that is fully compatible with the existing PET recycling streams as defined by the Association of Plastics Recyclers (APR) Critical Guidance.

Embodiment 28. An injection molded, stretch blow molded, or extrusion blow molded container with a polymer composition comprising a blend of the following:
(1) Bottle grade PET polymer, and
(2) One or more active oxygen scavenging additives including, but not limited to OxyClear™, DiamondClear™, valOR™, Amosorb™, HyGuard™, and
(3) a high level of IR absorbing reheat additive where the reheat additive comprises a weight fraction of the final container polymer of 25 or more parts per million (PPM), preferably 50 or more PPM, more preferably 100 or more PPM, and most preferably 200 or more PPM.

Embodiment 29. A container of Embodiment 28, where no catalyst is required to activate the oxygen scavenging additive.

Embodiment 30. A container of one of Embodiments 28 or 29, where the active oxygen scavenging additive (2) and the IR absorbing fast reheat additive (3) are blended together and confined to one or more discrete or semi-discrete layers comprising a multi-layer container structure.

Embodiment 31. A container of Embodiment 30, where no catalyst is required to activate the oxygen scavenging additive.

Embodiment 32. A container of one of Embodiments 30 or 31, where the layers of the final container have a reduced tendency to delaminate or separate.

Embodiment 33. A container of any one of Embodiments 30 to 32, that is fully compatible with the existing PET recycling streams as defined by the Association of Plastics Recyclers (APR) Critical Guidance.

EXAMPLES

Low IV Crystallization

A set of three low IV homopolymer resins were made in a 10-lb. reactor—0.37, 0.43 and 0.44 IV. The 0.43 IV resin had 1000 PPM $TiO_2$ added as a nucleate to further boost crystallization.

In multilayer injection molding units the viscosity differences between two layers was kept at 10%. The figure below gives a visual of IV spread. The table following it provides more details.

TABLE I

List of resin used for multilayer bottles

| Resin | | IV | $TiO_2$ PPM | State |
|---|---|---|---|---|
| Low IV | 1 | 0.37 | | Amorphous |
| | 2 | 0.43 | 1000 | Amorphous |
| | 3 | 0.44 | | Amorphous |
| | 4 | 0.52 | | Crystallized |
| | 5 | 0.56 | 2000 | Amorphous |
| | 6 | 0.58 | | Crystallized |
| Base IV | 1 | 0.84 | | Crystallized |
| | 2 | 0.75 | | Crystallized |

The crystallization and melting response of resins were analyzed by DSC with 3 heat cycles. In the first heat, the resin was heated at 20° C. $min^{-1}$ from 50° C. to 300° C. to melt the resin. This provided information on resin as received. In the next step the molten resin was rapidly quenched within the DSC unit to give the same thermal cooling history for all resins. In the second heat cycle, the resin was re-melted by heating to 300° C. This allowed comparison between resins. In an optional third heat, the molten resin was cooled in a controlled manner at 20° C. $min^{-1}$ to 50° C. to monitor crystallization extent and temperatures. The DSC for the resin set is given in FIG. 1.

The DSC trace of each of the three cycles confirmed the fundamental concept presented—the lower the IV, the faster the crystallization, and the higher the level of crystallization.

The first heat, while dependent on how resin was quenched or if it was pre-crystallized, showed the crystallization temperature for amorphous resins to move to lower temperatures for lower IV's. The pre-crystallized resins, 0.52 IV and 0.58 IV resins showed near absent $T_g$ transition and crystallization peak temperature, $T_c$. The lower melting point outlier of 0.52 IV was believed to be due to the influence of IPA.

The second heat was good for comparison. It showed that despite same rapid quenching for all resins prior to the second heat, the 0.37 IV and 0.43 IV with $TiO_2$ resins showed near absent transitions for $T_g$ and $T_c$, behaving just like crystallized resins. This suggested that these resins crystallized fast and to a higher extent during the quench step. The crystallization peak, $T_c$, shifted lower for lower IV. Lower $T_c$ indicated ease of crystallization.

The third heat brought out this fast crystallization very clearly. When cooling from melt, the lower IV started the formation of crystallized ordered structure early while it was still hot, 200° C., compared to 160° C. for 0.52 IV. The intermediate IV items followed the same trend.

Figure 2:
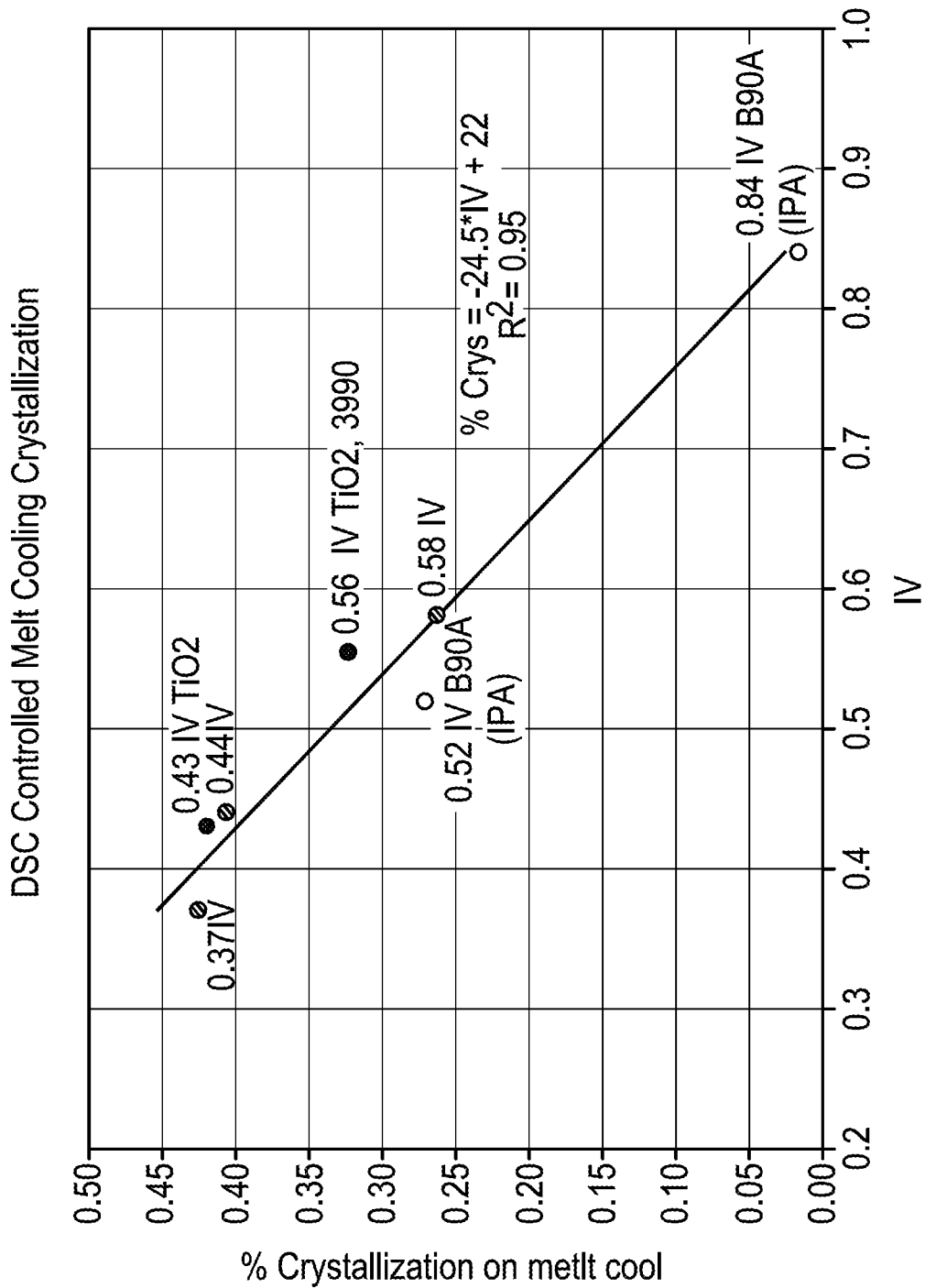
FIG. 2 shows calculated crystallization extent on melt cooling.

The crystallinity generated during cool down can be quantified from peak enthalpies. The plot of crystallinity vs. IV is shown in FIG. 2. The figure clearly shows that the lower the IV, the more the crystallization level. The levels of 40-45% for 0.37-0.44 IV are remarkable as these are near the maximum expected of crystallized resin.

The DSC data confirmed that low IV crystallizes readily.

Multilayer Bottles

Figure 3:
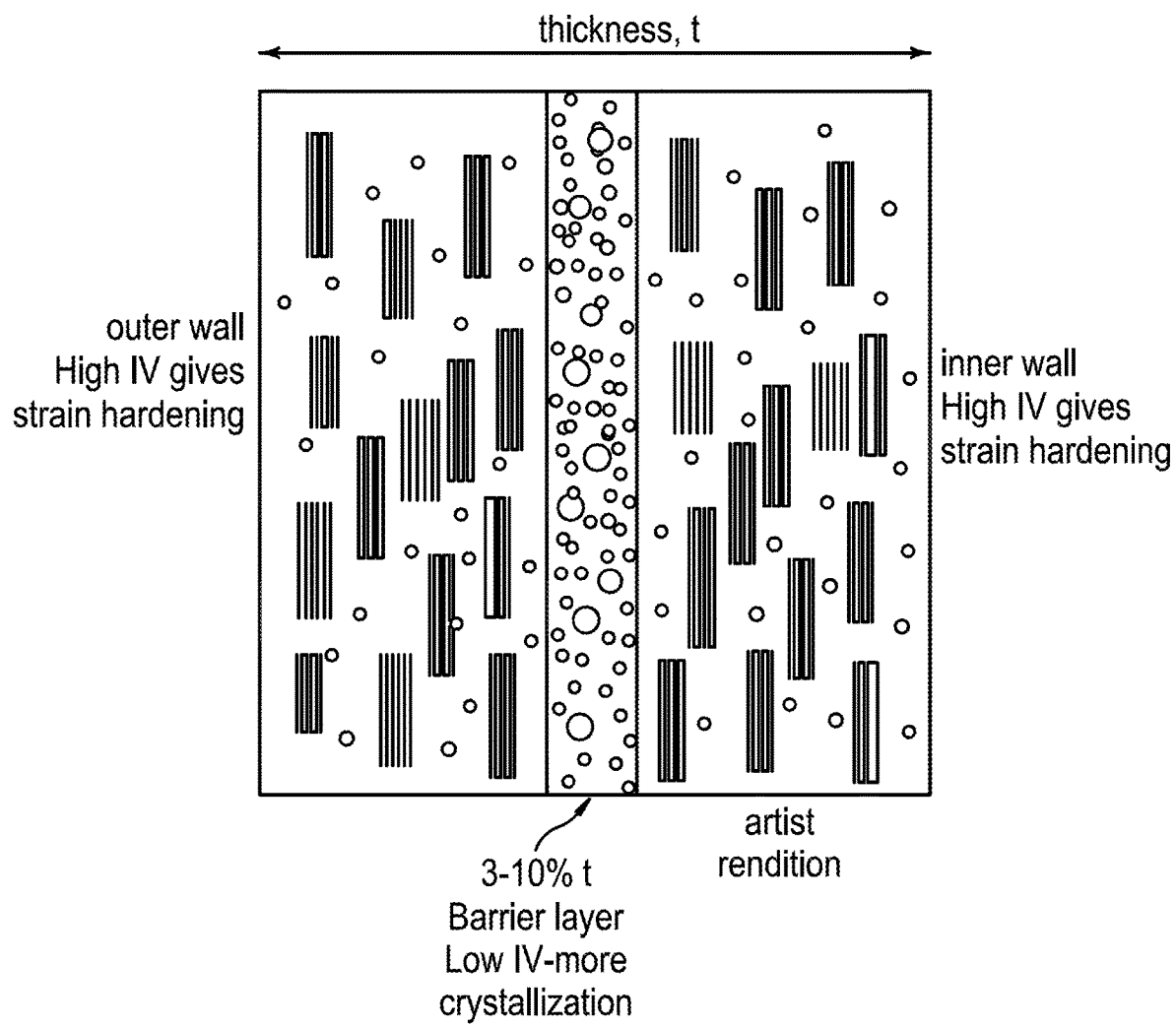
FIG. 3 shows crystallization in middle layer.

The multilayer bottle provides a unique way to study low IV resin. The bottle resin provides the form and the strength to blow a bottle, while a thin 10-15 WT % layer of low IV in the middle allows a visual examination for crystallization in isolation from the bottle resin (FIG. 3).

A Kortec unit was used to make multilayer preforms. The multilayer unit is of ABA type, where A is bottle resin and B is low IV in the middle. A 19 g preform was used to make a small portion 330 mL bottle. The design stretch ratio was 10:1. To aid feedback on middle layer uniformity, given the large viscosity difference, an Amber dye was added to the middle layer resin (ColorMatrix 269-10249-1, 0.0625 WT %). This corresponded to about 1 molecule of dye per 3000 molecules of PET monomer.

A number of combinations for middle and outside-inside layers were molded, and then blown under two sets of distinct conditions. In all there were 12 variants of preform (A though K) with corresponding blow molded variants. The table below summarizes the variants. All but one had middle layer set at 10 WT % of preform.

TABLE II

Multilayer Preform Resin Variants

| PTI-ID | A-layer | B-layer IV | B-layer wt % | B-layer Description |
|---|---|---|---|---|
| A | B90A | B90A | 10% | Control - Clear |
| B | B90A | 0.58 | 10% | Monofil-clear |
| C | B90A | 0.52 | 10% | CR-crystallized |
| D | B90A | 0.44 | 10% | PTR |
| E | B90A | 0.37 | 10% | PTR |
| F | B90A | 0.43 $TiO_2$ | 10% | PTR, 1000 PPM |
| G | B90A | 0.56 $TiO_2$ | 10% | 3990, 2000 PPM |
| H | L40A | 0.37 | 10% | PTR |
| I | L40A | 0.43 $TiO_2$ | 10% | PTR, 1000 PPM |
| J | L40A | L40A | 10% | Control - Clear |
| K | B90A | 0.56 $TiO_2$ | 15% | 3990, 2000 PPM |
| L | B90A | B90A | 10% | Control - Dye |

TABLE IV

Blow Mold Variants

| PTI-ID | A-layer | B-layer IV | B-layer wt % | B-layer Description | Preform heating time 40 sec | Preform heating time 90 sec |
|---|---|---|---|---|---|---|
| A | B90A | B90A | 10% | Control - Clear | A1 | A2 |
| B | B90A | 0.58 | 10% | Monofil-clear | B1 | |
| C | B90A | 0.52 | 10% | CR-crystallized | C1 | |
| D | B90A | 0.44 | 10% | PTR | D1 | D2 |
| E | B90A | 0.37 | 10% | PTR | E1 | E2 |
| F | B90A | 0.43 $TiO_2$ | 10% | PTR, 1000 PPM | F1 | F2 |
| G | B90A | 0.56 $TiO_2$ | 10% | 3990, 2000 PPM | G1 | |
| H | L40A | 0.37 | 10% | PTR | H1 | |
| I | L40A | 0.43 $TiO_2$ | 10% | PTR, 1000 PPM | I1 | |
| J | L40A | L40A | 10% | Control - Clear | J1 | |
| K | B90A | 0.56 $TiO_2$ | 15% | 3990, 2000 PPM | K1 | |
| L | B90A | B90A | 10% | Control - Dye | L1 | |

The variants include each of the six low to intermediate IV resins along with B90A base resin, and two with L40A as base resin to reduce viscosity difference for the lower IV samples. There were three controls—B90A and L40A with dye, and one B90A only without dye as a precaution in case the small dye molecule contributed to barrier properties.

The molding process was started by using B90A for all layers to get stable process conditions and serve as a control. Subsequent runs were made with next lower IV resin for the middle layer, and then followed by next lower IV. This was done to move down the viscosity gap and manage machine parameters to control the middle layer uniformity. It did get more difficult to run lower IV's. The issue was either the middle layer were pushed too far into the finish and bare at the base, or the middle layer was more at the base and not up near the neck. The two had to be balanced and the better preforms were selected.

The A-layer was run hotter to reduce melt viscosity of high IV component, and cooler for B-layer, the low IV component, to raise the melt viscosity. However, too much cooling brought about crystallization just as the DSC showed for lower IV's.

Blow Molding

The 12 sets of preforms were blow molded to 300 ml bottles. Each run required adjusting the preform heating zone to give a good weight distribution between top, middle, and bottom sections.

In the first round these were run at 900 bottles per hour, with an estimated 40 sec heating in preheat zone (variants A to L). An additional four were run at 450 bottles per hour, with approximately 90 sec of preheating. These were run as A2, D2, E2 and F2, as listed in the table below. The reason to give more preheat time was to see if extra heating encouraged crystallization. A delamination check was made by applying force on the bottles, none were seen. Of all the bottles, the one with 2000 PPM $TiO_2$ 0.56 IV had most difficulty in controlling the weight distribution. The variants are listed in table below, and a complete machine data is provided in appendix for future reference.

Visually, amongst clear resins, the 0.37 IV bottle had a perceptible haze, confirming enhanced crystallization.

Promotion of Bottle Nucleation by Low IV PET

The low IV resin (0.37 IV) was mixed molded into discs in MiniJector with 0.84 IV B90A at 15%, 25%, and 50% weight proportion, along with a control with just 0.84 IV B90A. Two sets of discs were made, thick 0.15" and thin 0.10". These discs were studied for crystallization and haze.

For crystallization studies, a molded disc sample was ground and run in a TA DSC unit. These were run with three heat cycles—sample heated to melting to 300° C. in the first cycle, quenched rapidly to 50° C., reheated to melting in the second, and then cooled back at a steady rate in the third.

Figure 4:
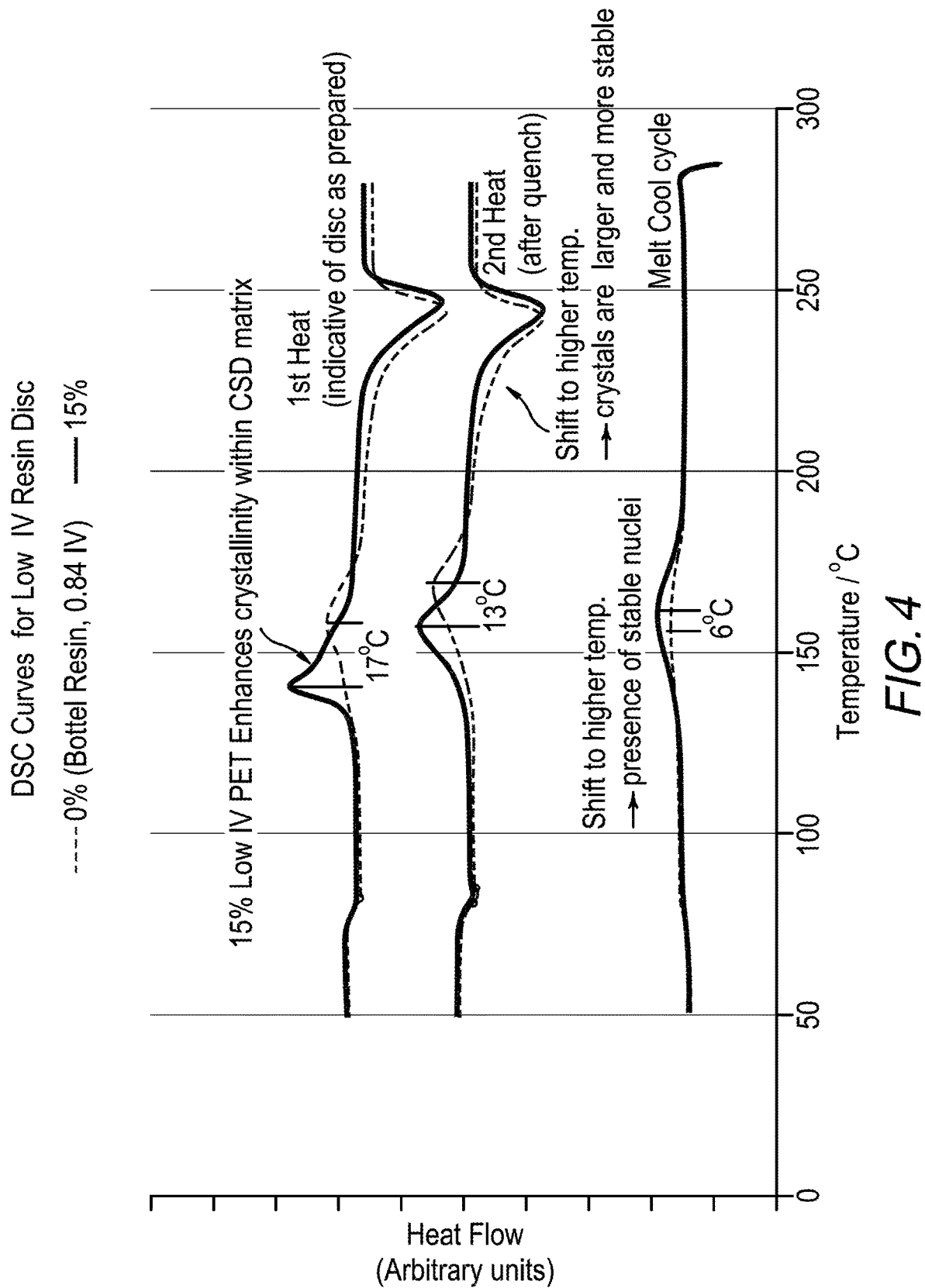
FIG. 4 shows DSC curves for a low IV resin.

The DSC in first heat provides insight into two processes—crystallinity level in molded discs, and more interestingly, the promotion of nucleation due to presence of low IV. The plot below, FIG. 4, shows the shifts between of 15 wt. % resin (blue) and control (red) with bottle resin only (0% Low IV). The crystallization peak occurs 17° C. early, and a bimodal peak is noted. This is a lot of change for just a 15% addition of the low IV resin. This will be more evident in FIG. 5 when the rest of the data is presented. The melting point shifts to a slightly higher temperature indicating a more stable or larger crystal formation. The trends in second and third heat cycles point in a similar direction.

Figure 5:
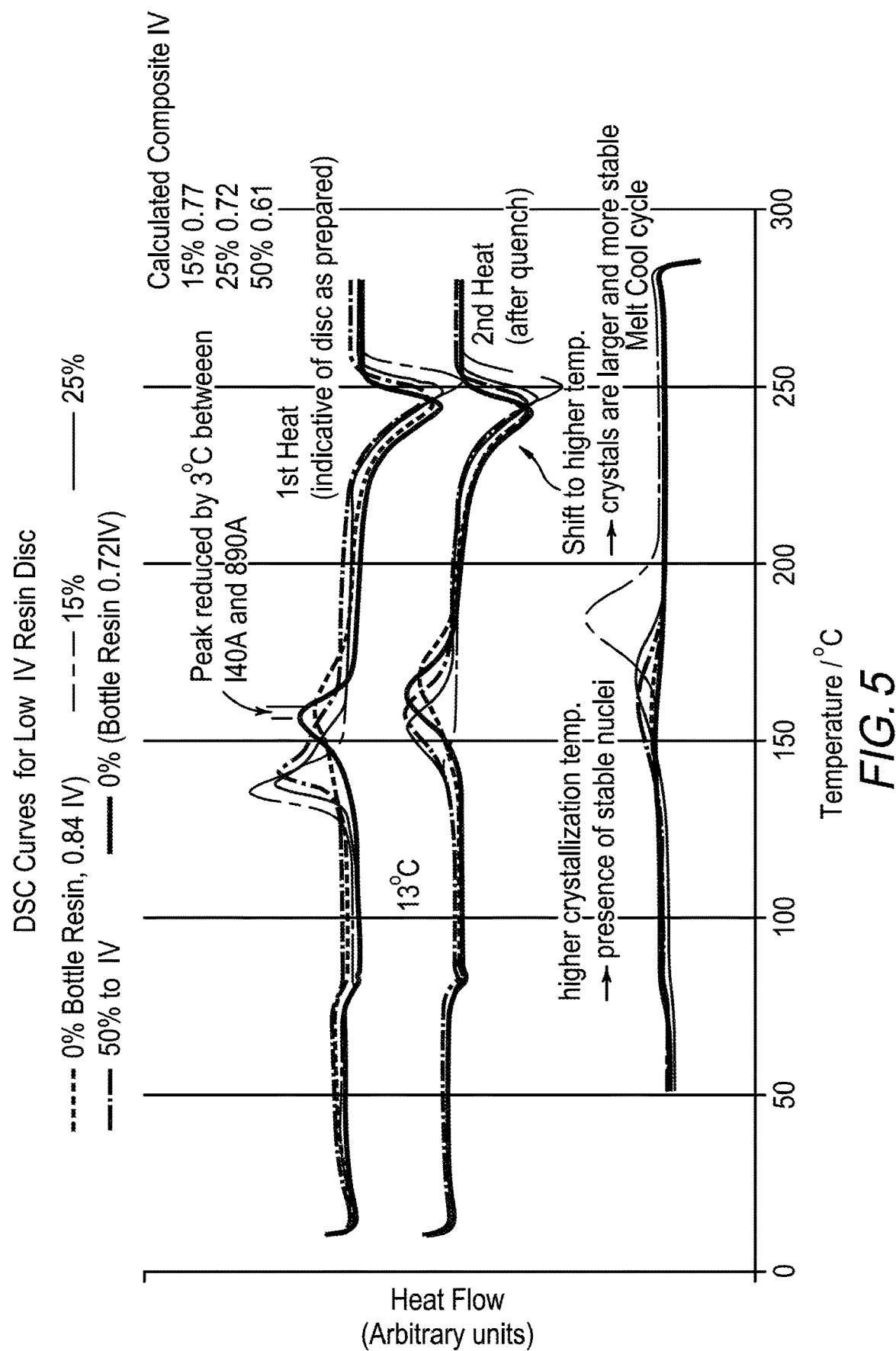
FIG. 5 shows DSC curves for a low IV resin.

The second DSC plot, FIG. 5, shows all the molded sample along with 0.72 IV resin as additional control to show that the shift in peaks is not an artifact of average IV when 0.37 and 0.84 IV resin are mixed in proportion. The shift from 0.84 to 0.72 IV is just 3° C. in the first heat cycle. The average IV for a 25 WT % low IV mix is 0.72, and the peak shift is 20° C. for this disc. This is a clear indication that the peak shift is due to low IV nucleating the matrix. In all these plots, all trends point in one direction—easier to crystallize and more crystallinity.

Figure 7:
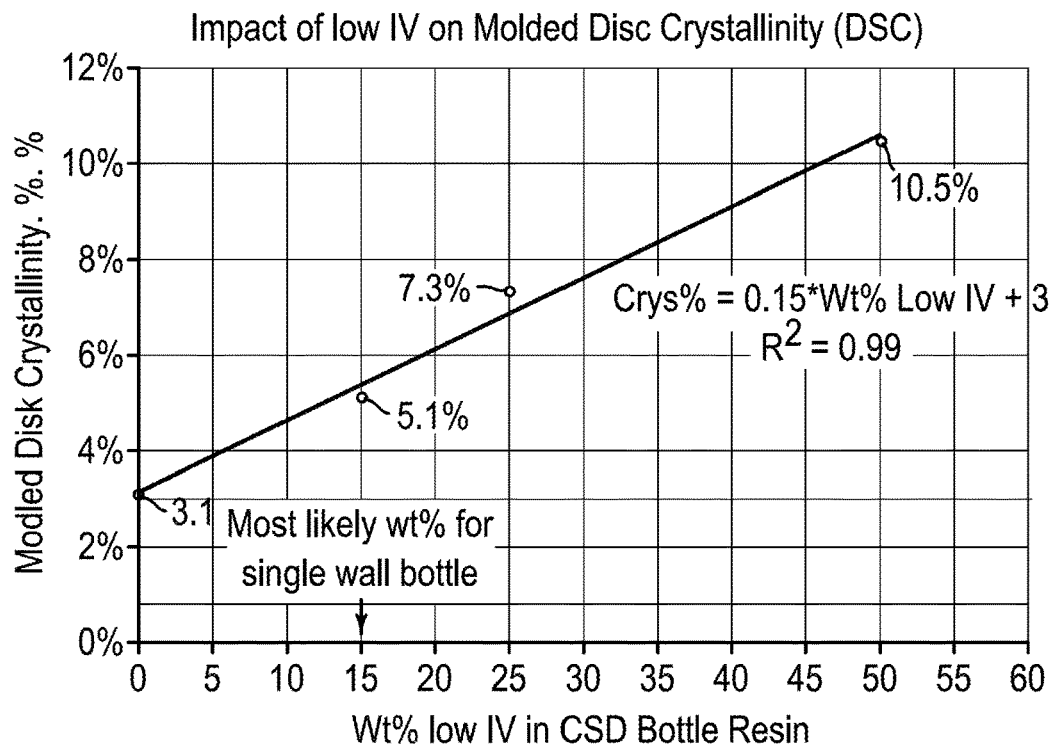
FIG. 7 shows impact of low IV on molded disc crystallinity.

The crystallization data in FIG. 7 is from first heat cycle and is reflective of crystallization achieved during injection molding of the disc. The trend shows a steady increase in crystallization as the proportion of lower IV component is increased. The increase in crystallinity from 3.1% to 5.1% for a 15 WT % blend represents a significant jump of about 65% over control resin. This number is expected to be much higher in actual preform, because there is hardly any mixing in ram style disc injector, and a true extruder will disperse low IV as nucleant much more efficiently. The most likely dosing for trials with preforms will be 15 WT % or less.

Figure 6:
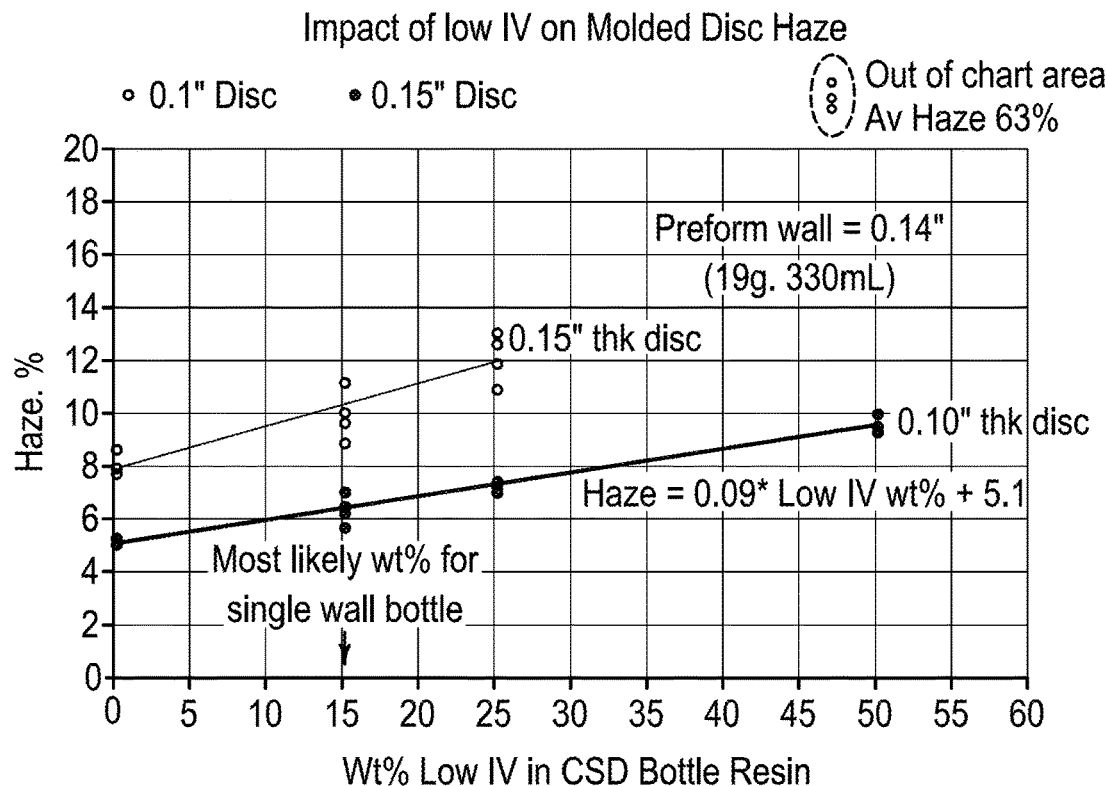
FIG. 6 shows impact of low IV on molded disc haze.

The haze data shows a steady increase in haze level as the WT % of low IV resin is increased (FIG. 6). The plot shows the trend for the two sets of discs. Four discs were made for each case except for 50 WT % which was three. Each of these measurements is plotted as individual points to show the scatter in the fit. The thicker disc shows higher haze due to greater path length as well as effect of comparatively slower cooling rate. In the most extreme case of 50 WT %, the thicker disc gives a significantly higher haze level at 63%. This is shown beyond the top edge of plot area.

It is interesting to note that the wall thickness for a small preform 19 g (330 mL) bottle is 0.14" and is similar to that of the thicker disc at 0.15". This suggests the thicker molded disk to be a better predictor for a preform for both, haze and crystallization. However, the dispersion of low IV resin in bottle IV resin is as good as physical mixing of resin pellets fed into the disc injector. Unlike an extruder there is no mixing in a ram style disc injector. The haze values in an actual preform could be higher or lower depending on the size and count of nuclei particles.

Obviously, numerous modifications and variations of the present invention are possible in light of the above teachings. It is therefore to be understood that within the scope of the appended claims, the invention may be practiced otherwise than as specifically described herein.

The invention claimed is:

1. A molded container having an interior cavity defined by a polymer film wall, wherein the polymer film wall comprises:
   (1) a polymer blend layer comprising a blend of a high intrinsic viscosity PET and a low intrinsic viscosity PET, and
   (2) an A-B-A multilayer structure wherein the A layers are outer films made of the high intrinsic viscosity polyethylene terephthalate (PET) and the B layer is a barrier film made of the low intrinsic viscosity PET;
   wherein the barrier film has a thickness of 3-10% of the total thickness of the A-B-A multilayer structure,
   where the high intrinsic viscosity PET has a solution IV between about 0.65 and about 1.30 dL/g and the low intrinsic viscosity PET has a solution IV of 0.55 dL/g or less,
   wherein the molded container is a member selected from the group consisting of an injection molded container, a stretch blow molded container, and an extrusion blow molded container.

2. The container of claim 1, where the weight percentage (WT %) of the low intrinsic viscosity PET comprises between 2 and 50 WT % of the polymer film wall.

3. The container of claim 1, where the high intrinsic viscosity PET has an IV between 0.70 to 0.9 dL/g.

4. The container of claim 1, wherein the polymer film wall does not contain active $O_2/CO_2$ gas barrier additives.

5. The container of claim 1, where the gas barrier properties of the container remain unchanged over time by ambient conditions.

* * * * *